United States Patent
Confalone et al.

(10) Patent No.: US 6,734,244 B2
(45) Date of Patent: May 11, 2004

(54) COATING COMPOSITION FOR INKJET APPLICATIONS

(75) Inventors: Philip Confalone, Raritan, NJ (US); Rajeev Farwaha, Belle Mead, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 10/241,934

(22) Filed: Sep. 11, 2002

(65) Prior Publication Data

US 2004/0048964 A1 Mar. 11, 2004

(51) Int. Cl.$^7$ .................................................. C08K 3/26
(52) U.S. Cl. ........................ 524/425; 428/507; 428/511; 428/522
(58) Field of Search ........................... 524/425; 428/507, 428/511, 522

(56) References Cited

U.S. PATENT DOCUMENTS

| 5,207,824 | A | * | 5/1993 | Moffatt et al. | ............ 106/31.58 |
| 5,356,464 | A | * | 10/1994 | Hickman et al. | ........ 106/31.36 |
| 5,833,744 | A | * | 11/1998 | Breton et al. | ............ 106/31.59 |
| 5,969,003 | A | * | 10/1999 | Foucher et al. | ............. 523/160 |
| 6,013,410 | A | * | 1/2000 | Arai | ........................... 430/264 |
| 6,086,661 | A | * | 7/2000 | Malhotra et al. | ........ 106/31.43 |
| 6,383,275 | B1 | * | 5/2002 | Lin | ......................... 106/31.27 |
| 6,432,184 | B1 | * | 8/2002 | Malhotra et al. | ........ 106/31.43 |
| 6,475,271 | B2 | * | 11/2002 | Lin | ......................... 106/31.27 |
| 2002/0193514 | A1 | * | 12/2002 | Wang et al. | ................ 524/853 |
| 2002/0196321 | A1 | * | 12/2002 | Katsuki | ...................... 347/100 |

* cited by examiner

*Primary Examiner*—Margaret B. Medley
(74) *Attorney, Agent, or Firm*—Thomas F. Roland; Charles W. Almer

(57) ABSTRACT

The present invention relates to a coating composition for fibrous substances containing 25 to 75 percent by weight of pigment, and 0.5 to 25 weight percent of a polymer comprising 1 to 15 percent by weight of one or more monomers having sterically hindered secondary amine groups and 10 to 40 weight percent of a carboxylic acid monomer. The coating is useful on fibrous and non-fibrous substrates on which liquid inks will be fixed. The non-ionic polymer becomes cationic when contacted by anionic inks, and the cationic nature of the coating provides the substrate with an excellent point of attachment for inks and dyes, resulting in bright, crisp printed images. The coating is especially useful for ink-jet printing on paper, paperboard, textiles, non-wovens, wood, and films.

6 Claims, No Drawings

COATING COMPOSITION FOR INKJET APPLICATIONS

FIELD OF THE INVENTION

The invention relates to a coating composition, and especially to a coating composition useful in ink jet applications. Specifically the coating composition contains pigment and a water-dispersible hydrophobically modified copolymer prepared from at least one vinyl monomer, at least one carboxylic acid monomer, and 1 to 15 percent of one or more monomers containing a sterically hindered amine functionality. The coating is especially useful for ink-jet printing on paper, paperboard, textiles, non-wovens, glass, films, laminates, and wood.

BACKGROUND OF THE INVENTION

Fibrous substrates, such as paper, are coated to produce a smoother and less absorbent surface on which to apply printing inks and other functional coatings. The coating composition typically comprises naturally occurring or man-made pigments, synthetic or natural polymer coating binders, water, and small amounts of miscellaneous additives. The pigments are used to fill and smooth the uneven surface of the fibrous paper web, while the binder is used to hold the pigment particles together and to hold the coating layer to the paper. Typical paper coating binders are composed of synthetic polymers, natural polymers, or a mixture of these components.

The paper coating must also act to fix the ink on the surface, preventing it from running on the surface or bleeding though a substrate. This fixing produces good print definition and print quality. Since the inks used in most printing applications are anionic, one means of fixing the inks to the substrate is to have a coating with some cationic character. There are several examples of cationic paper coatings in the art. U.S. Pat. No. 6,153,288 discloses ink-receptive compositions having a pigment dispersed in a binder containing a vinyl acetate emulsion binder, and a water soluble cationic copolymer. Coating compositions containing polymers having low levels of tertiary amine functionality, up to 0.4 mole percent, are disclosed in U.S. Pat. No. 4,944,988. U.S. Pat. No. 5,660,928 discloses a multi-layer paper coating for ink jet printing which contains as a third layer a cationic water soluble polymer, U.S. patent application Ser. No. 10/152,354, discloses cation ic coating compositions containing polymers formed from vinyl ester monomers and from 0.4 to 3 mole percent of a cationic monomer, which preferably contains primary, secondary, or tertiary amine groups.

Amphoteric water soluble polymers useful for ink absorbing layers, and formed from anionic and cationic monomers with an aziridine crosslinking agent are disclosed in JP 07184082. JP 11222346 discloses a cold sealing adhesive for color ink-jet containing an amphoteric polymer prepared from anionic monomer and dimethylaminoethylbenzyl chloride. U.S. Pat. No. 4,305,860 describes the use of polyampholytes as paper-making aids. These polymers are made from an anionic monomer, a cationic monomer, a hydrophobic monomer, and a hydrophilic monomer. A problem with amphoteric, betaine, and ampholytic polymers is that they contain cationically charged species, which can react with anionic pigments, binder, cobinder, and other components of the coating composition.

There is a need for an aqueous-based, water-insoluble non-ionic polymer useful for ink-receptive coatings, which provides excellent print quality.

Surprisingly it has been found that copolymers containing a sterically hindered amine functionality and a carboxylic acid functionality, remain non-ionic in a coating composition having a neutral or alkaline pH. These copolymers then become cationic when in the presence of acidic inks. Coatings containing these polymers provide excellent ink-retention without the negative effects found with cationically charged polymers. These coatings may be used on fibrous substances, as well as films and laminates.

SUMMARY OF THE INVENTION

The present invention is directed to an ink-receptive coating composition useful on a variety of substrates. The coating composition contains 25 to 75 percent by weight of pigment, and 0.5 to 25 weight percent of a copolymer formed from 1 to 15 percent by weight of one or more monomers having sterically hindered secondary amine groups, and 10 to 40 percent by weight of one or more carboxylic acid monomers.

The invention is also directed to a substrate having coated directly thereon a coating composition containing 25 to 75 percent by weight of pigment, and 0.5 to 25 weight percent of a polymer comprising 1 to 15 percent by weight of one or more monomers having sterically hindered secondary amine groups, and 10 to 40 percent by weight of one or more carboxylic acid monomers.

DETAILED DESCRIPTION OF THE INVENTION

The present invention relates to coating compositions useful in ink jet applications. Specifically the coating composition contains pigment and a water-dispersible hydrophobically modified copolymer prepared from at least one carboxylic acid monomer, 1 to 15 percent of one or more monomers containing sterically hindered secondary amines, and at least one vinyl monomer.

The copolymer of the invention contains one or more carboxylic acid units. The carboxylic acid may be a mono-carboxylic acid, dicarboxylic acid, or a mixture thereof. Preferably the copolymer contains from 10 to 40 percent, and more preferably from 15 to 25 percent by weight carboxylic monomer units. Examples of carboxylic acid monomers useful in forming the copolymer include, but, are not limited to, acrylic acid, methacrylic acid, maleic anhydride, itaconic acid, crotonic acid, ethacrylic acid, alpha-chloro-acrylic acid, alpha-cyano acrylic acid, beta methyl-acrylic acid (crotonic acid), alpha-phenyl acrylic acid, sorbic acid, alpha-chloro sorbic acid, angelic acid, cinnamic acid, p-chloro cinnamic acid, beta-styryl acrylic acid (1-carboxy-4-phenyl butadiene-1,3), itaconic acid, maleic acid, citraconic acid, mesaconic acid, glutaconic acid, aconitic acid, fumaric acid, tricarboxy ethylene, and 2-acryloxypropionic acid. Preferred carboxylic acid monomers are acrylic acid, methacrylic acid, or a mixture thereof.

The copolymer contains monomer units having sterically hindered secondary amines. By sterically hindered amines, as used herein, is meant a secondary amine group that is beside a t-butyl or iso-propyl group in the monomer molecule. These monomers may be represented by the formula:

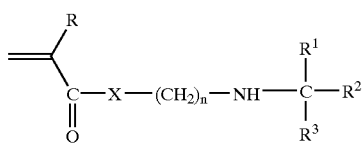

wherein R is H, an alkyl, alkenyl, or aryl group; X is O, N, P, or S; n is from 2 to 10; $R^1$ is H or $(CH_2)_{1-3}$; $R^2$ is $(CH_2)_{1-12}$; and $R^4$ is H or $(CH_2)_{1-3}$. Preferably the monomer units having sterically hindered dsecondary amines are acrylates or acrylamides.

The sterically hindered amines do not have an ionic charge in the copolymer, and do not react with carboxylic acid monomers, yet can become cationic when placed in an acidic environment, and/or when they come in contact with ink-jet printing ink. This is different from cationic polymers and additives found in the art which contain permanent cationic charges. The acrylate monomers having sterically hindered amines are generally alkyl ($C_2$–$C_4$) esters of acrylic and methacrylic acids, and include, but are not limited to N-t-butylaminopropyl acrylate, N-t-butylaminoethyl methacrylate, N-t-butylaminoethyl methacrylamide, N-t-butyl amino ethyl acrylamide. The sterically hindered amine monomer is present in the copolymer at from 1 to 15 weight percent, and preferably from 1 to 10 weight percent.

The vinyl monomer useful in forming the copolymer in addition to the sterically hindered amine monomer and carboxylic acid monomer, can be one or more monomers selected from ethylenically unsaturated monomers other than the carboxylic acid monomer and sterically hindered secondary amine acrylate monomer. The vinyl monomers may include, but are not limited to, maleates, (meth)acrylamides, itaconates, styrenics, unsaturated hydrocarbons and acrylonitrile, nitrogen functional monomers, alcohol functional monomers, unsaturated hydrocarbons, and (meth)acrylates. The vinyl monomer(s) is present in the copolymer at from 60 to 90 percent by weight, and more preferably from 65 to 80 percent by weight. In a preferred embodiment, the copolymer contains alkyl (meth)acrylate and/or alkyl (meth)acrylamide monomer units. By (meth)acrylate as used herein is meant acrylate, methacrylate, or a mixture thereof. Likewise, by (meth)acrylamide as used herein is meant acryamide, methacrylamide, or a mixture thereof.

In one embodiment of the invention, the copolymer is formed from 10 to 60 weight percent, and preferably 15 to 50 percent by weight of at least one $C_1$ to $C_{12}$ alkyl (meth)acrylate monomer. Examples of alkyl (meth)acrylates useful in the copolymer include, but are not limited to, methyl methacrylate, isobutyl methacrylate, ethyl hexyl methacrylate, butyl acrylate, and n-butyl methacrylate. Preferred alkyl (meth)acrylates are $C_1$ to $C_8$ (meth)acrylates.

In one embodiment of the Invention, the copolymer is formed from 20 to 70 weight percent of at least one $C_4$–$C_{10}$ N-substituted alkyl (meth)acrylamide. Preferred alkyl (meth)acrylamides include, but are not limited to, t-alkyll (meth)acrylamide. Most preferably the N-alkyl acrylamide is t-octyl (meth)acrylamide.

Other vinyl monomers may be included in the copolymer to enhance the properties of the coating composition.

Small amounts of cross-linking monomers, such as, but not limited to, N-methylol acrylamide, 2-acetoacetoxy ethyl methacrylate, and trialkoxy silane, may also be present in the polymer. Slightly cross-linked copolymers are especially useful in textile printing processes.

Preferred copolymers are those containing 1 to 15 percent by weight of acrylate monomer units having sterically hindered secondary amines, 10 to 60 weight percent of a $C_1$–$C_{12}$ alkyl (meth)acrylate, 20 to 70 weight percent of a $C_4$–$C_{10}$ N-substituted alkyl (meth)acrylamide, and 10 to 40 weight percent of acrylic acid, methacrylic acid, or a mixture thereof. The percentage s total 100 percent.

The copolymer is formed by a solution polymerization process. The process involves free-radical polymerization by use of a free-radical generating initiator system. The monomer may be added to the initial charge, may be delayed Into the reactor over a period of several hours, or some amount may be added to the initial charge, with the remainder of the monomer delayed. Once polymerization is complete, the polymer may be separated from the solution and dried by means known In the art.

The polymer formed is a low molecular weight polymer, having a molecular weight of between 10,000 and 100,000, preferably from 10,000 to 30,000.

The copolymer is soluble in alcohols, such as methanol, ethanol, and isopropyl alcohol. It is insoluble in water, but becomes soluble when neutralized. Neutralization of the acidic copolymer may be achieved by reaction with appropriate alkaline materials. Generally, it is preferred for the neutralization to be as complete as possible for better water solubilily. Neutralization should be at least 70 percent, preferably at least 80 percent, and most preferably at least 90 percent neutralized. Neutralization may be accomplished by any base, preferably ammonium hydroxide, sodium hydroxide, potassium hydroxide, or a mixture thereof.

A typical ink-jet paper coating composition contains 25 to 80 percent by weight of inorganic pigments, and preferably 55 to 75 percent by weight. The choice of pigment is based on the properties required in the paper surface. Commonly used pigments include silica, kaolin, calcium carbonate, titanium dioxide, talc, zinc oxide, alumina, and polystyrene. Unlike cationically charged polymers used in paper coatings, which may precipitate highly anionic pigments like calcium carbonate, the polymer of the present invention may be used with anionic, cationic, and non-ionic pigments.

In addition to pigment, the coating composition typically contains 10 to 30 percent by weight of a binder; 2 to 9 percent by weight of cobinders such as protein, casein, and starch; 0.1 to 1.5 percent by weight of other additives; and 25 to 45 percent by weight of water. The binder may be entirely composed by the copolymer of the present invention, or can be a blend of the copolymer with other natural or synthetic polymer binders such as polyvinyl alcohol, styrene-butadiene polymer, or polyvinylpyrrolidone.

Other additives that may be incorporated into a coating composition include, but are not limited to, rheology modifiers, penetrating agents, wetting agents, thermal gelling agents, sizing agents, defoaming agents, foam suppressors, blowing agents, coloring matters, fluorescent whiteners, ultra violet absorbers, oxidation inhibitors, antiseptic agents, dispersants crosslinking agents (to improve wet strength and solvent resistance), antistatic agents, lubricants, plasticizers, pH regulators, setting promoters, adhesion promoters, and water-proofing agents.

The coating composition is formulated by first solubilizing the polymer of the invention in an aqueous alkaline solution, then adding it to the coating mix containing pigment, cobinder, water, and other additives under low shear. The minor coating additives are generally added last.

The coating may be applied to one or more surfaces of a substrate, for use as an ink- or dye-receptive surface. The substrate may be a fibrous substrate, a film, or a laminate. Examples of fibrous substrates Include, but are not limited to paper, paperboard, wood, leather, skin, hair, textiles, non-wovens. Textiles and non-wovens may be formed from natural and/or synthetic fibers/filaments (including glass). Paper includes any paper that will receive ink or dye, including printer paper, as well as printed papers such as wallpaper, wrapping papers. Films include plastics. Laminates are any layered materials containing two or more rigid substrates bonded together, adhesively, physically, or by other means.

The polymer coating composition can be applied to one or more sides of the substrate by any means known in the art. Paper-coating methods include, but are not limited to, roll applicator and metering with roll, rod, blade, bar, or air knife; pond applicator and metering with roll, rod, blade, bar, or air knife; fountain applicator and metering with roll, rod, blade, or bar, or air knife; pre-metered films or patterns (e.g., gate roll, three-roll, anilox, gravure, film press, curtain, spray); and foam application. Examples of such processes include, but are not limited to, film-press methods in which paper is fed through rollers which have been coated with the coating composition, and which is transferred to the paper surface under pressure. The thickness of the coating is controlled by the thickness of the coating composition applied to the rollers. The coating compositions may be applied to a variety of other substrates by spraying, brushing, foaming, and immersing.

The following examples are presented to further illustrate and explain the present invention and should not be taken as limiting in any regard.

EXAMPLE 1

Synthesis of Copolymer

A monomer mixture is blended containing by weight, 25 parts methyl methacrylate, 50 parts t-octyl acrylamide, 20 parts acrylic acid, and 5 parts t-butylaminoethyl methacrylate. A reaction vessel equipped with a condenser was charged with 15 parts of the monomer mixture, 23.3 parts of ethyl alcohol, and 0.5 parts of t-amyl peroxypivalate. The reactor contents are mixed and heated to reflux. A delay feed containing 118 parts of the monomer mixture was fed to the reactor over 6 hours. A second delay of 7.5 parts ethyl alcohol, 32.7 parts isopropyl acetate, and 5 parts t-amyl peroxypivalate is also fed to the reactor over 7 hours. When the delays are complete, the reactor is held at reflux for a few hours, and cooled. Once cool, the polymer is stabilized with 1 part sodium hydroxide in 163 parts of water. The reaction contents are then steam distilled, cooled, filtered, and oven dried.

EXAMPLE 2

Solubilization of Copolymer

A well agitated tank is filled with an appropriate amount of water to form a 15 percent polymer solution. Alkali (e.g. sodium hydroxide or ammonium hydroxide) is added to the dilution water to obtain the desired neutralization, which is typically about a 10 percent solids on solids solution. The dry polymer from Example 1 is added slowly to the vortex of the dilution water, to avoid the build-up of undissolved polymer. The solution is allowed to blend for about 30 minutes for good dispersion and solubilizatlion.

EXAMPLE 3

Preparation of Ink-jet Recording Sheet

A groundwood free base sheet having a basis weight of approximately 40 lbs./3300 square feet was coated with the coating compositions on one side to about 4.0 lbs. per ream and oven dried. The sheet was then tested for performance properties.

EXAMPLE 4

Testing and Results

The following tests were performed on the coated Inkjet recording sheets of Example 3

Optical density is the degree of darkness and/or spectural reflectance of printed colors as measured by a MACBETH RD-514 Reflection Densitometer for each of the listed colors.

Percent show through is the undesirable appearance of a printed image on the opposite side of the printed substrate. It was measured by optical density (OD), following the calculation: percent showthrough=(OD on opposite side of a printed area divided by OD of the printed area),×100.

Print gloss is the reflection (specular gloss) of light off of a printed ink film at an angle of incident light, measured print gloss using a Hunter glossmeter at 75 degrees.

Print definition is the text quality and/or sharpness as measured by optical density and total area/perimeter measurements. Wicking and/or feathering caused by spreading of the ink is undesirable.

Color bleed is the spreading of one color into another, as measured by optical density and total area/perimeter measurements.

EXAMPLE 5

Coating Composition Formulation—Silica Pigment

Coating compositions were formed using a 15 percent by weight silica slurry having a particle size of 10 microns. The coatings were formulated at 100 parts silica pigment to 25 parts of binder on a solids/solids basis, with water, producing a coating having about 15 percent solids. The binder formulations were:

5A: (comparative) 25 parts CELVOL 107 polyvinyl alcohol

5B: (comparative) 16 parts CELVOL 107 and 9 parts polyvinyl pyrrolidone

5C: 25 parts of the polymer of Example 1

5D: 9 parts of the polymer of Example 1, and 16 parts CEVOL 107

Ink-jet recording sheets were prepared as described in Example 3, and tested as described in Example 4, producing the following results.

|  | 5A (Comp) | 5B (Comp) | 5C | 5D |
|---|---|---|---|---|
| Coating Composition |  |  |  |  |
| Percent Solids | 15.2 | 15.6 | 15.4 | 15.4 |
| pH | 7.0 | 7.0 | 7.4 | 7.2 |
| Brookfield Viscosity, cps (20° C.) |  |  |  |  |
| Initial | 92 | 92 | 58 | 74 |
| 4 hr | 86 | 74 | 62 | 80 |
| 24 hr | 50 | 44 | 64 | 72 |
| Coating Weight, Lbs/3300 sq ft | 4.2 | 4.0 | 4.1 | 4.1 |
| TEST RESULTS: |  |  |  |  |
| Optical Density |  |  |  |  |
| Black | 1.41 | 1.45 | 1.61 | 1.60 |
| Cyan | 1.54 | 1.60 | 1.71 | 1.65 |
| Yellow | 1.02 | 1.04 | 1.07 | 1.05 |
| % Show-through |  |  |  |  |
| Black | 15.7 | 11.5 | 9.8 | 10.8 |
| Cyan | 22.2 | 19.0 | 17.4 | 17.0 |
| Yellow | 27.0 | 22.9 | 20.5 | 22.6 |
| Print Gloss (black only) | 3.2 | 4.8 | 6.3 | 5.9 |
| Print Definition |  |  |  |  |
| Total Area, mm$^2$ | 9.51 | 9.48 | 8.61 | 8.97 |
| Total Perimeter, mm | 3.47 | 3.20 | 3.14 | 3.13 |
| Color Bleed |  |  |  |  |
| Total Area, mm$^2$ | 21.19 | 20.77 | 19.13 | 19.77 |
| Total Perimeter, mm | 4.88 | 4.78 | 4.48 | 4.72 |

EXAMPLE 6

Coating Composition Formulation—Calcium Carbonate Pigment

Coating compositions were prepared using fine ground calcium carbonate pigment (90 percent less than 2 microns) at 100 dry parts pigment to 12 dry parts binder, and water to form about a 59 percent by weight solids formulation. Ammonium hydroxide and a rheology modifier (ALCOGUM L-229) were added to produce a formulation Viscosity of about 2250 cps.

6A: (comparative) 12 parts Dow 620 styrene butadiene rubber.
6B: (comparative) 10 parts DQW 620 styrene butadiene rubber, 2 parts polyvinyl pyrrolidone
6C: 10 parts Dow 620 styrene butadiene rubber, 2 parts polymer of Example 1.
6D: 8 parts Dow 620 styrene butadiene rubber, 4 parts polyrner of Example 1.

Ink-jet recording sheets were prepared as described in Example 3, and tested as described in Example 4, producing the following results:

|  | 6A (Comp) | 6B (Comp) | 6C | 6D |
|---|---|---|---|---|
| Coating Composition |  |  |  |  |
| NH$_4$OH | 1.0 | 0.4 | 0.4 | 0.2 |
| Rheology Modifier | 0.7 | 0.4 | 0.4 | 0.1 |
| Percent Solids | 58.6 | 59.2 | 59.2 | 59.6 |
| pH | 10.3 | 10.2 | 10.2 | 10.4 |
| Brookfield Viscosity, cps (20° C.) |  |  |  |  |
| Initial | 2295 | 2250 | 2230 | 2235 |
| 4 hr | 3534 | 3830 | 3700 | 4060 |
| 24 hr | 4080 | 4520 | 4570 | 4620 |
| Coating Weight, Lbs/3300 sq ft | 4.7 | 5.0 | 4.8 | 4.8 |
| TEST RESULTS: |  |  |  |  |
| Optical Density |  |  |  |  |
| Black | 1.89 | 1.94 | 1.98 | 1.95 |
| Cyan | 0.97 | 1.01 | 1.08 | 1.03 |
| Yellow | 0.62 | 0.69 | 0.72 | 0.62 |
| % Show-through |  |  |  |  |
| Black | 32.0 | 25.7 | 22.1 | 24.9 |
| Cyan | 33.0 | 27.5 | 26.0 | 28.2 |
| Yellow | 37.0 | 34.9 | 31.4 | 35.3 |
| Print Gloss (black only) | 26.7 | 23.4 | 29.5 | 31.2 |
| Print Definition |  |  |  |  |
| Total Area, mm$^2$ | 9.69 | 9.58 | 8.54 | 8.68 |
| Total Perimeter, mm | 3.35 | 3.25 | 3.24 | 3.27 |
| Color Bleed |  |  |  |  |
| Total Area, mm$^2$ | 22.24 | 21.91 | 20.28 | 20.41 |
| Total Perimeter, mm | 5.12 | 4.79 | 4.50 | 4.61 |

What is claimed is:

1. An ink-receptive coating composition, wherein said coating composition comprises a dispersion comprising:

a) 0.5 to 25 percent by weight of a water-insoluble copolymer comprising the following monomer units:
    1) 1 to 15 percent by weight of one or more monomer units containing sterically hindered secondary amine groups, said monomers having the formula:

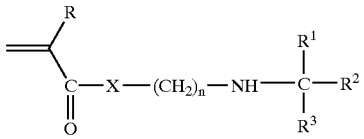

wherein R is H, an alkyl, alkenyl, or aryl group; X is O, N, P, or S; n is from 2 to 10;
R$^1$ is H or (CH$_2$)$_{1-3}$; R$^2$ is (CH$_2$)$_{1-12}$; and R$^4$ is H or (CH$_2$)$_{1-3}$;
    2) 10 to 40 percent by weight of one or more carboxylic acid monomer units; and
    3) one or more other vinyl monomer units;
    b) 25 to 80 percent by weight pigment; and
    c) water.

2. The coating composition of claim 1 wherein said pigment comprises silica.

3. The coating composition of claim 1 wherein said pigment comprises calcium carbonate.

4. A coated substrate comprising a fibrous substrate having coated directly on at least one surface a coating composition comprising a copolymer polymerized from a monomer mixture comprising:

a) 1 to 15 weight percent of acrylate monomer containing hindered amine groups;
    b) 40 to 60 weight percent of a C$_1$ to C$_{12}$ alkyl (meth) acrylate;
    c) 20 to 40 weight percent of C$_4$ to C$_{10}$ N-substituted alkyl (meth)acrylamide; and
    d) 10 to 40 weight percent of acrylic acid, methacrylic acid, or a mixture thereof; wherein said water-insoluble polymer has a molecular weight of from 10,000 to 30,000.

5. The coated substrate of claim 4, wherein said substrate is fibrous and comprises paper, paperboard, textile, nonwoven, or wood.

6. The coated substrate of claim 4, wherein said substrate comprises a film or laminate.

* * * * *